United States Patent Office 3,188,022
Patented June 8, 1965

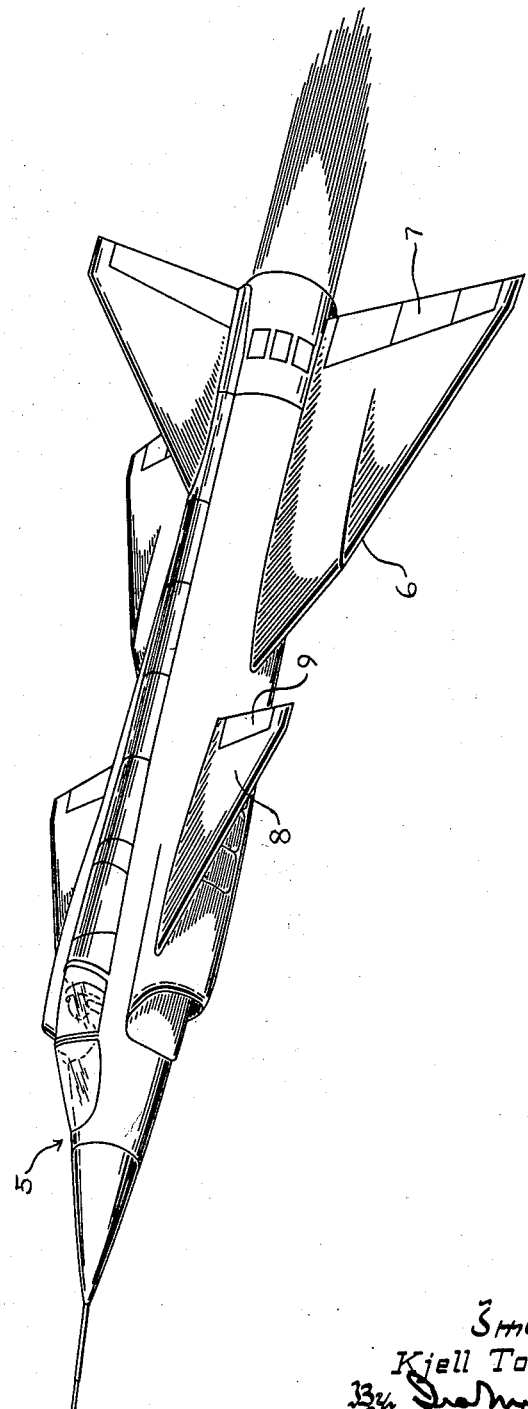

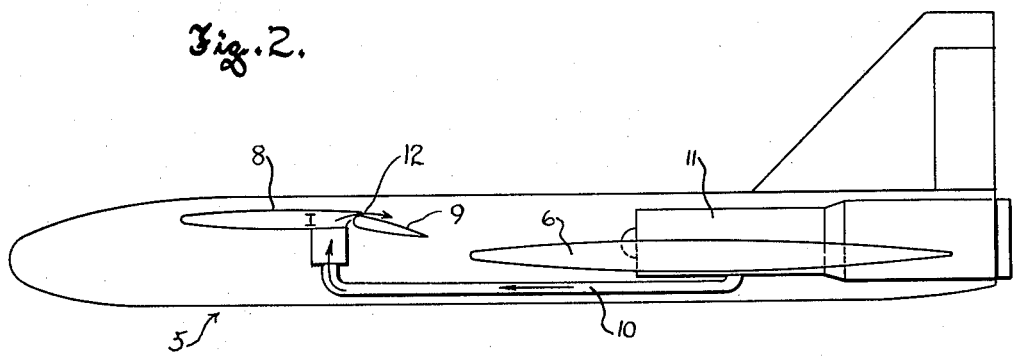
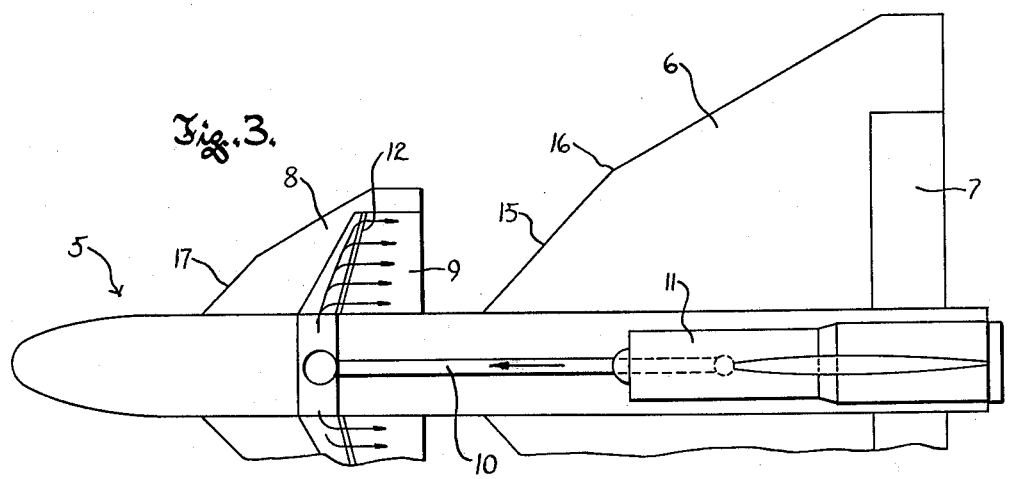
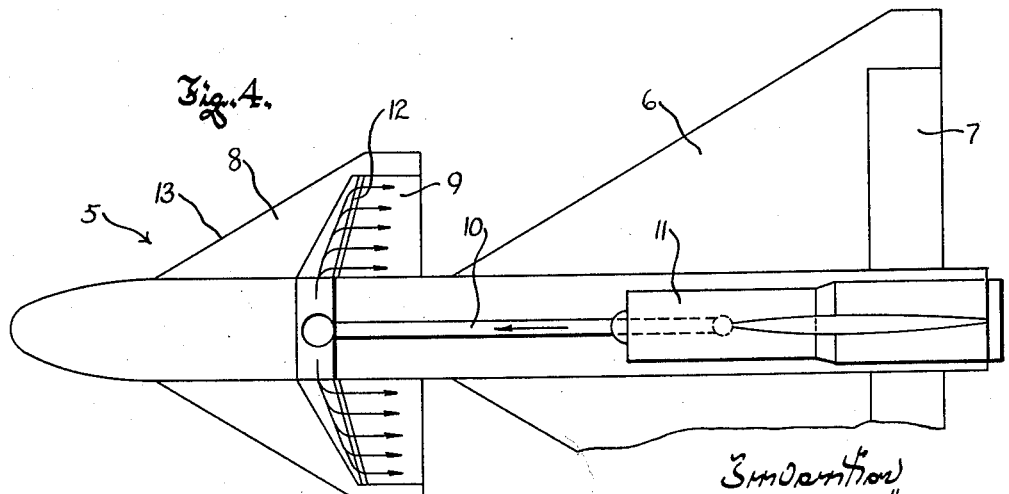

3,188,022
DELTA WING CANARD AIRCRAFT
Kjell Torsten Örnberg, Linkoping, Sweden, assignor to Svenska Aeroplan Aktiebolaget, Linkoping, Sweden, a corporation of Sweden
Filed Dec. 5, 1963, Ser. No. 328,335
7 Claims. (Cl. 244—45)

This invention relates to aircraft of the delta wing canard configuration and refers more particularly to improvements in aircraft of the type having a thin, sharply swept-back main wing and a secondary wing located ahead of the main wing, which improvements overcome certain heretofore existing problems relating to the stability and controllability of such aircraft.

The air flow over a conventional wing of relatively high camber, having little or no sweepback, and operating at a low angle of attack and substantially below sonic velocities, tends to follow the upper surface of the wing for a substantial distance back from the leading edge. Air flow separation occurs closer to the leading edge as the angle of attack increases until, at the stalling angle, the airflow separates from the upper surface at or near the leading edge.

However, with a thin, sharply swept-back wing, at least in subsonic flight, the air flow begins to separate from the upper surface of the wing at or very near its swept-back leading edges, even at low angles of attack. The leading edge separation produces concentrated edge vortices which induce high suction peaks on the surface under them. The vortex suction peaks increase the lifting effect of the wing. Instead of stalling the wing the leading edge separation on the sharply swept-back wing increases the lift when the angle of attack is increased until the vortex-system collapses due to internal or external disturbances. It is obvious that the lifting effect of such a wing is very much dependent upon the existence of the leading edge vortices and their behaviour.

Since the lift of a thin delta wing with sharply swept-back leading edges depends upon the existence of vortices in the air flowing in proximity to its upper surface, the performance and stability characteristics of an aircraft having such a wing will depend upon the characteristics of these vortices, which can in turn be affected by disturbances that the vortices encounter behind the wing during their passage rearwardly along the aircraft. In high speed subsonic flight, for example, a substantial disturbance of a vortex downstream from the wing can propagate a pressure wave forwardly along the vortex. In producing a relatively rapid increase in pressure in the low pressure core of the vortex, such a wave can cause the entire vortex to collapse, thus bringing about a large and sudden change of lift force and moment generated by the wing.

In one of its aspects the present invention resides in a recognition that the location of the secondary wing in known delta wing canard aircraft gave rise to severe problems of instability and/or loss of control under at least some of the conditions occurring within the normal flight range of angles of attack.

In those prior delta wing canard aircraft where the secondary wing was located at or above the level of the main wing, and a substantial distance ahead of it, loss of stability occurred whenever the aircraft was trimmed in an effort to bring its angle of attack to a value on the order of 15° or more. Loosely speaking, the secondary wing under these conditions stalled and lost its lift, while the main wing continued to generate lift, with the result that a nose-down pitching moment was applied to the aircraft. Somewhat more accurately, the vortices from the secondary wing were deflected relatively upwardly away from its entire upper surface at the higher angles of attack, resulting in a loss of lift of the secondary wing; but at the same time the vortices of the main wing remained bound to its top surface, due at least in part to deflection of air downwardly from the underside of the secondary wing, so that the main wing continued to generate lift. It is obviously intolerable in an aircraft to have an arrangement which permits a control surface to stall or lose its effectiveness under circumstances where the main supporting surface is still generating substantially normal lift.

The stability and control problems posed by prior delta wing canard aircraft having the secondary wing at or above the level of the main wing were serious, but even worse conditions were encountered when the secondary wing was located below the level of the main wing. During flight at low angles of attack with such an arrangement, the vortices of the secondary wing passed along the under surface of the main wing, reducing its lift due to the induced suction on its under surface and thus caused the aircraft to have poor lift generating capability. Since the lifting effect of the secondary wing was however substantially undisturbed at low angles of attack, the respective lift forces due to the main and secondary wings acted to produce a nose-up pitching moment. At some higher angle of attack the leading edge of the main wing interfered with the vortices from the secondary wing, causing a collapse of those vortices with consequent loss of lift of the secondary wing, producing a nose-down pitching moment. At still higher angles of attack the secondary wing produced a sort of blanketing effect upon the main wing as the vortices trailing the secondary wing were deflected relatively upwardly from the leading edge of the main wing, drawing the vortices formed over the main wing away from its upper surface, and thus interfering with the lift generating ability of the main wing to an even greater extent than when the secondary wing vortices flowed along its underside. As a consequence there was produced a larger nose-up pitching moment due to further loss of lift of the main wing while the secondary wing continued to generate lift. These unstabilizing conditions were aggravated by the fact that the transition from flow of secondary wing vortices beneath the main wing to flow over the upper surface of the main wing was a severely abrupt one, occuring during a slight increase in angle of attack, so that it was possible to encounter a change from a condition of nose-down pitching moment to one of nose-up pitching moment in the course of a small change in trim.

With the secondary wing located a substantial distance ahead of the main wing, as in prior delta wing canard configurations, there were also serious problems of directional stability. In a sideslip condition, one of the secondary wing vortices toward which the aircraft was slipping encountered the vertical fin surface and produced a large local sidewash, resulting in serious loss of directional stability and control. If the sideslip condition was sufficiently acute so that the vortex core was disturbed by the fin, the vortex could collapse, with a resultant marked reduction of dynamic pressure in front of the fin that had seriously detrimental effects on directional stability at the same time that the effectiveness of the rudder was reduced.

Thus the delta wing canard arrangment, although offering great promise in some areas of performance, has heretofore posed serious stability and control problems, and under some circumstances has presented the threat of catastrophic instability. However, it is an object of the present invention to provide an aircraft of the delta wing canard configuration wherein the above described problems of stability and controllability are eliminated, at least within the range of angles of attack corresponding to normal flight conditions, and wherein the vortices developed by the secondary wing and the main wing respectively cooperate to produce a well-balanced vortex-system where neither collapses nor deflections of the leading edge vortices arise and wherein the vortices developed by the secondary wing when passing over the main wing give it an additional lift due to vortex induced suction on its upper surface.

Hence it can be said to be an object of this invention to provide an arrangement of the main and secondary wings in a delta wing canard aircraft whereby the secondary wing is utilized as a means of maintaining the vortices over the main wing in close proximity to its upper surface, even at high angles of attack.

Another object of this invention is to provide an arrangement of the main and secondary wings in an aircraft of the character described whereby the two wings cooperate with one another at all angles of attack within the normal flying range to effect mutually beneficial influences upon one another, each acting to sustain the vortex system over the other.

A further object of this invention is to provide an arrangement of the main and secondary wings of a delta wing canard type of aircraft which is particularly well suited for relatively short and medium size aircraft, such as a combat airplane, wherein it is not feasible to employ a spacing between the main and secondary wings large enough to prevent detrimental interference between them.

With the above and other objects in view which will appear as the description proceeds, this invention resides in the novel construction, combination and arrangement of parts substantially as hereinafter described and more particularly defined by the appended claims, it being understood that such changes in the precise embodiments of the hereindisclosed invention may be made as come within the scope of the claims.

The accompanying drawings illustrate two complete examples of the physical embodiments of the invention constructed according to the best modes so far devised for the practical application of the principles thereof, and in which:

FIGURE 1 is a perspective view of a canard type of airplane having thin, sharply swept back main and secondary wings and which embodies the principles of the present invention;

FIGURE 2 is a more or less diagrammatic side view of an aircraft having the wing arrangement of this invention and incorporating a flap blower system;

FIGURE 3 is a more or less diagrammatic plan view of an aircraft incorporating an embodiment of the wing arrangement of this invention; and FIGURE 4 is a view generally similar to FIGURE 3 but showing a modified embodiment of the invention.

Referring now more particularly to the accompanying drawings, the numeral 5 designates generally an aircraft embodying the principles of this invention and which has a thin, sharply swept-back main wing 6 with trailing edge control surfaces 7. Located ahead of the main wing is a secondary wing 8 which likewise is of delta planform and has a thin airfoil section.

As is conventional, trim control of the aircraft about its pitch axis can be effected by rotating the secondary wing to change its angle of incidence and/or by movement of a trailing edge flap on the secondary wing. It is advantageous to use a trailing edge flap 9 and to provide boundary layer control across the upper surface of the flap, employing for this purpose a bleed-off 10 from the compressor section of the aircraft engine 11 (see the diagram, FIGURE 2). The air bleed-off operates in a known manner to carry pressurized air from the compressor to an outlet 12 which is directly adjacent to the upper surface of the flap 9 and at its leading edge, so as to produce an accelerated air flow across the top of the flap when the same is lowered, thereby preventing air flow separation.

According to the present invention, the secondary wing 8 is located only a relatively short distance ahead of the main wing 6 and at a higher level than the main wing. If the main wing attains an optimum lifting force at an angle of attack of 15° to 25°, and if the area of the lifting surface of the secondary wing is on the order of 15% to 30% of the area of the lifting surface of the main wing, the distance between the two wings measured lengthwise of the aircraft (that is, along its X axis) should be less than one-half of the root chord of the secondary wing; and although the secondary wing should have a substantial spacing above the main wing, the projected distance between the wings should be less than one third of the root chord of the secondary wing. When the secondary wing is provided with a trailing edge flap, the vertical spacing of the two wings should be such that at least the major portion of the flap in its fully extended or deflected position lies between the projected chord lines of the wings. Those skilled in the art will recognize, however, that the optimum horizontal and vertical spacings of the main and secondary wings relative to one another will vary within certain limits, depending upon the geometry of the aircraft and the performance of its control surfaces or trim devices.

With the two wings located and arranged in accordance with the principles of this invention, they tend to cooperate in generating a unified vortex system which remains substantially stable at all angles of attack within the normal flying range. The above described positioning of the secondary wing relative to the main wing enables the leading edge vortices produced by the main wing to bind the vortices of the secondary wing to the upper surface of the main wing as well as, due to forward interference effects, to the upper surface of the secondary wing.

This coaction between the wings is mutually beneficial to their vortex systems because the downwash and acceleration of the air in the vortices over the main wing causes the vortices of the secondary wing to be drawn downwardly toward the upper surface of the main wing, and since this downstream influence upon the secondary wing vortices is reflected back upstream, the vortices over the secondary wing are prevented from being deflected relatively upwardly from its surface, and the flow in the secondary wing vortices is stabilized. Such mutually beneficial coaction between the two wings occurs at all angles of attack within the normal flight range.

It will be self-evident that the binding of the vortices from the secondary wing to the vortex system of the main wing occurs at small angles of attack. At higher angles of attack the vortex system developed by the secondary wing still parallels the vortex system over the main wing, and such exchange of energy as occurs between the vortex systems of the respective wings is not detrimental to either vortex system. Hence the wing arrangement of this invention is conducive to a well balanced development of the flow around the aircraft as a whole, with the result that the aircraft can be satisfactorily trimmed to substantially high angles of attack without encountering any undue loss of stability or control.

As illustrated in FIGURE 4, each wing can have a true delta planform, with a leading edge 13 which is sharply swept back and straight along its entire length. However, the sweepback of the inboard portion of the main wing can be reduced, as at 15 (see FIGURE 3), to define a leading edge portion that is at a less acute angle to the longitudinal centerline of the aircraft. Preferably the reduction in sweepback of the leading edge is confined to that portion thereof which is between the fuselage and a point 16 on or in the vicinity of a line passing through the tip of the secondary wing and extending parallel to the longitudinal centerline of the aircraft. Such reduction in sweepback of the inboard portion of the main wing leading edge can be obtained without material loss of the stability characteristics of the aircraft, and it permits the aspect ratio of the main wing to be increased, thus affording an increased lifting capacity for the aircraft without incurring a proportionate increase in drag.

If desired, the sweepback of the inboard portion of the leading edge of the secondary wing can be similarly reduced, as at 17, in order to improve the pilot's forward visibility and/or shorten the aircraft. This will not seriously affect the aerodynamic properties of the aircraft because the flow that characterizes a wing having a uniform sharp sweepback will be substantially maintained.

From the foregoing description taken together with the accompanying drawings it will be apparent that this invention provides a delta wing canard type of aircraft which is not subject to the stability and control problems that have heretofore characterized aircraft of that configuration and wherein good stability and control are maintained throughout the normal flight range of angles of attack by reason of the fact that the main and secondary wings cooperate with one another to produce a mutually favorable interaction, whereby the vortex system of each is utilized to bind the vortices over the upper surface of the other to that upper surface.

What is claimed as my invention is:

1. A delta wing canard aircraft characterized by the following:
   (A) a main wing having leading edges swept back at least about 55° and a thin profile, with a fineness ratio of not more than about 10% at every point, so that concentrated vortices tend to form over the upper surface of the wing, near its leading edges, which vortices induce high suction on the surface areas under them;
   (B) a delta secondary wing which is of substantially smaller area than the main wing and which has similarly sharply swept back leading edges and a thin profile so that concentrated vortices tend to form over its upper surface, near its leading edges, which vortices induce high suction on the surface areas under them;
   (C) the secondary wing being located
      (1) above the level of the main wing and
      (2) ahead of the main wing
      (3) but sufficiently close to the main wing both longitudinally and vertically of the aircraft to achieve a coaction between said concentrated vortices such that the vortices of the main wing are capable of effectively preventing deflection of said vortices of the secondary wing relatively upwardly away from the upper surface of the same and such collapse thereof that their lifting effect is decreased, and whereby said vortices of said two wings are bound to one another at all angles of attack within the normal flight range so that rear control surfaces of the aircraft are prevented from being disturbed by the vortices.

2. The aircraft of claim 1, further characterized by the fact that the sweepback of the leading edge of the main wing is reduced through that inboard portion thereof which is directly behind the secondary wing.

3. A delta wing canard aircraft having a main wing and a secondary wing of substantially smaller area spaced ahead of the main wing, characterized by the following:
   (A) each of said wings having its leading edges so sharply swept back as to define an angle of not less than about 55° to a line transverse to the longitudinal axis of the aircraft;
   (B) each of said wings having a profile so thin that its thickness at any point is less than about 10% of its chord at the same point;
   (C) the distance between the main and secondary wings, measured along said axis, being less than about one-half the root chord of the secondary wing; and
   (D) the secondary wing being mounted above the level of the main wing, with a pronounced spacing between the planes of the wings, which spacing is however equal to less than about one-third of the root chord of the secondary wing.

4. The aircraft of claim 3, further characterized by the following:
   (A) downwardly deflectable trailing edge flap means on the secondary wing providing for longitudinal control of the aircraft, at least the major portion of said flap means, in any position of deflection thereof, being located above the level of the main wing; and
   (B) boundary layer control means for producing an accelerated flow of air across the upper surface of the flap means from the leading edge thereof.

5. In an aircraft having a main wing that has its leading edges swept back at least about 55° and having a profile so thin that its thickness at any point is not more than about 10% of its chord at the same point, so that the lifting force of the wing is attributable to concentrated vortices which extend over the upper surface of the wing near its leading edges and trail behind it, means for stabilizing the aircraft about its pitching axis comprising:
   (A) a secondary wing having leading edges swept back at least about 55° and having a profile so thin that its thickness at any point is not more than about 10% of its chord at the same point; and
   (B) means mounting said secondary wing on the aircraft
      (1) above the level of the main wing and sufficiently close to the main wing, longitudinally of the aircraft, to achieve a coaction between the wings such that the vortex system over the main wing tends to prevent deflection of the vortex system over the secondary wing relatively upwardly away from the upper surface of the same, such coaction between the wings effecting a substantial binding of their vortex systems to one another at all angles of attack of the aircraft within the normal flight range.

6. The aircraft of claim 5, further characterized by the fact that the inboard portion of the leading edge of the main wing is at a more obtuse angle to the longitudinal center line of the aircraft than the outboard portion of said leading edge, said inboard and outboard leading edge portions defining an obtuse angle which lies on a line substantially through the tip of the secondary wing and parallel to said center line.

7. The aircraft of claim 5, further characterized by: means for trimming and controlling the aircraft about its pitch axis comprising:
   (A) downwardly deflectable trailing edge flap means on the secondary wing, at least the major portion of which is above the plane of the main wing in every position of the flap means; and
   (B) boundary layer control means by which air flow over the upper surface of the flap means is accelerated.

References Cited by the Examiner

UNITED STATES PATENTS 2,844,337  7/58  MacArthur et al. _____ 244—42.41

FOREIGN PATENTS 679,897  9/52  Great Britain.

FERGUS S. MIDDLETON, *Primary Examiner.*